US007366664B2

(12) United States Patent
Cogliano

(10) Patent No.: US 7,366,664 B2
(45) Date of Patent: *Apr. 29, 2008

(54) INTERACTIVE BOOK

(75) Inventor: Mary Ann Cogliano, Santa Rosa, CA (US)

(73) Assignee: Dreamations LLC, Santa Rosa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/523,063

(22) Filed: Sep. 19, 2006

(65) Prior Publication Data

US 2007/0011011 A1      Jan. 11, 2007

Related U.S. Application Data

(63) Continuation of application No. 10/135,577, filed on May 1, 2002, now Pat. No. 7,110,945, and a continuation-in-part of application No. 09/356,324, filed on Jul. 16, 1999, now Pat. No. 6,405,167.

(51) Int. Cl.
*G10L 15/00*      (2006.01)

(52) U.S. Cl. .................. 704/235; 704/260; 704/270

(58) Field of Classification Search ................ 704/235, 704/260, 270
See application file for complete search history.

(56) References Cited

U.S. PATENT DOCUMENTS

| 4,636,173 | A |   | 1/1987  | Mossman |
|-----------|---|---|---------|---------|
| 4,829,576 | A |   | 5/1989  | Porter |
| 4,884,972 | A | * | 12/1989 | Gasper ................. 434/185 |
| 4,997,374 | A |   | 3/1991  | Simone |
| 5,010,495 | A |   | 4/1991  | Willetts |
| 5,466,158 | A |   | 11/1995 | Smith, III |
| 5,495,557 | A |   | 2/1996  | Hyman et al. |
| 5,538,430 | A |   | 7/1996  | Smith et al. |
| 5,794,249 | A |   | 8/1998  | Orsolini et al. |
| 5,802,533 | A |   | 9/1998  | Walker |
| 5,820,379 | A |   | 10/1998 | Hall et al. |
| 5,920,838 | A | * | 7/1999  | Mostow et al. ............ 704/255 |
| 6,021,306 | A |   | 2/2000  | McTaggart |
| 6,124,851 | A |   | 9/2000  | Jacobson |
| 6,163,768 | A |   | 12/2000 | Sherwood et al. |
| 6,181,351 | B1 |  | 1/2001  | Merrill et al. |
| 6,199,042 | B1 | * | 3/2001 | Kurzweil .................... 704/260 |
| 6,324,511 | B1 |  | 11/2001 | Kiraly et al. |
| 6,336,089 | B1 | * | 1/2002 | Everding ....................... 704/1 |
| 6,500,006 | B2 | * | 12/2002 | Wakamoto .................. 434/156 |

\* cited by examiner

*Primary Examiner*—Daniel Abebe
(74) *Attorney, Agent, or Firm*—Hoffman, Wasson & Gitler

(57) ABSTRACT

An electronic interactive book allowing a child to learn the pronunciation of various words. The book will be provided with a permanent or impermanent display onto which a plurality of words, phrases or sentences would be provided. The electronic book includes a microphone as well as a speech recognition unit for recognizing a word that the child pronounces. A highlighting device such as a light emitting diode or a means for illuminating a particular word in a manner different than the surrounding words would be engaged when the child correctly pronounces that word. The highlighting device has the ability to assist the child in the pronunciation of one of the words by verbally pronouncing a portion of the word, as well as simultaneously highlighting that portion. A visual display of the lip movements of an animated character would also assist the child in correctly pronouncing a particular word.

8 Claims, 7 Drawing Sheets

INTERACTIVE BOOK

This application is a continuation of U.S. patent application Ser. No. 10/135,577 filed May 1, 2002 now U.S. Pat. No. 7,110,945 and is a continuation-in-part of U.S. patent application Ser. No. 09/356,324, filed Jul. 16, 1999, issued as U.S. Pat. No. 6,405,167.

BACKGROUND OF THE INVENTION

1. Field of the Invention

The present invention is directed to an interactive book allowing a child to associate a particular written word or phrase with its aural equivalent.

2. Description of the Prior Art

Due to its importance in a child's education, great emphasis has been placed on teaching a child to read. During a child's development, the child initially learns to associate various sounds or words with particular objects. For example, the child would learn to enunciate a particular word such as "mama", "dada", "key" or "cheese". Once this person or object comes into view, the child would then begin to pronounce the word associated with this person or object. As the child's learning ability increases, these sounded words would become associated with the written word. This would be true regardless of whether a child's speech and reading pattern would be developed utilizing a phonics approach or by associating the entire verbalized word with an entire written word. Utilizing either approach, as the child grows, his or her reading skills would also increase.

Typically, the approach to teaching a child to read would require the child to read in the presence of an adult or older child or in the educational setting of a classroom including one teacher and a number of students. In either situation, the child would attempt to read a series of words or a rudimentary story and, if the child is successful in correctly pronouncing a word or phrase, the child would be rewarded by the teacher or other individual indicating that the child has correctly pronounced the word, words or phrase. While the child could attempt to read this book by himself or herself, the child would have no indication whether the words were correctly pronounced.

Various devices have been developed which attempt to teach a child to associate the spoken word with the written word. These devices could take the form of an electronic book or computerized device as described in U.S. Pat. No. 4,997,374, issued to Simone; U.S. Pat. No. 5,495,557, issued to Hyman et al; U.S. Pat. No. 5,538,430, issued to Smith et al; and U.S. Pat. No. 5,820,379, issued to Hall et al. For example, the patent to Simone discloses a teaching device provided with a console unit into which a work booklet is placed. The console unit also includes an audio program capable of reproducing the words provided on each of the pages of the work booklet. A plurality of light emitting diodes is provided beneath each of the words. Therefore, when the audio program is played, each of the lights would be illuminated separately corresponding to the particular word which is verbalized by the audio program. While this teaching device would allow a child to associate an audio word with a written word, this device would not be helpful to assist a child in determining whether the child is correctly pronouncing a written word.

Similar to the Simone device, the device described in the Hyman et al patent is directed to an electronic book which enunciates words or phrases corresponding to sentence parts and a complete sentence. These words or phrases are arranged in particular categories and by depressing various buttons, an audio sentence is produced. However, similar to the Simone teaching device, this toy does not allow a child to associate the child's pronounced word with the written word.

The patent to Smith et al describes a self-reading child's book displaying a sequence of indicia, such as words. A light emitting diode is associated with each of the words. Therefore, if the child would activate a switch associated with a line of words or an entire page of words, a voice synthesizer would be driven to verbalize the word as well as to illuminate the light emitting diode associated with each word. However, similar to the Simone and Hyman et al patents, no provision is made to determine whether the child is correctly pronouncing the word.

The patent to Hall et al shows a computerized method of displaying a self reading child's book provided with a computer display screen having sequential words forming a story read by a child. The child would have the ability of moving a cursor or a type of visual indicator corresponding to the words on the screen. However, as was true with the previous references, a word pronounced by the child is not associated with any of the written words, thereby failing to indicate to the child whether that word was pronounced correctly by the child.

U.S. Pat. No. 4,636,173, issued to Mossman, describes a method of teaching reading involving a combined video and audio recording utilizing words projected upon a screen, such as motion picture films or videotape. The audio recording would produce an aural output and each of the words would be temporarily highlighted in synchronization with the spoken word. It is important to note that the rate of recording and synchronization with the temporary highlighting of the pronounced syllable or word cannot be altered once a recording has been made. Utilizing this system, it would be difficult to teach a child to recognize the sound of a particular word, since the speed of the recording might be too fast to allow the child to associate a spoken word with its written equivalent.

Another manner in which a child is taught to pronounce a particular word would be to associate the spoken word with the written word by allowing the child to picture the movement of the lips of an individual or animated character, as the word is being pronounced. U.S. Pat. No. 6,181,351, issued to Merrill et al is directed to a system for synchronizing the moveable mouths of animated characters with recorded speech and includes a speech recognition engine, the engine is used to associate one of a plurality of mouth movements with a particular word or phenome. However, no provision is made for allowing the non-recorded speech generated by a child to be used with a device for highlighting a series of words in a sequential manner based upon the child's speech and synchronizing this speech with mouth movements produced by the animated character.

SUMMARY OF THE INVENTION

The aforementioned deficiencies in the prior art are addressed by the present invention which includes an electronic book or display allowing a child to read words, phrases or stories, while affirming the fact that a particular word is correctly pronounced. The book or electronic device would include a speech recognition unit embodied in one or more memory chips. The book would have various words and phrases which would constitute a single story or multiple stories. Alternatively, a changeable electronic display could be provided which, based upon the child's input, would be changed to display various pages of a book. A light emitting diode or similar device would be associated with each of the words. A microphone would be provided allowing the child to verbally read the story shown in the electronic book. If the child correctly pronounced the word that he or she was reading, the light emitting diode or similar device associated with that particular word would be illuminated. Alternatively, a liquid crystal display could be utilized in such a manner that if the child correctly pronounced the word, that word would be highlighted. By the utilization of the interactive electronic book according to the present invention, the child's learning process would be reinforced.

Another embodiment of the present invention would recognize when a child is having difficulty pronouncing a particular word. The memory chip would include the digital word associated with a particular word written on the display device. This memory chip, in conjunction with a voice chip associated with the speech recognition unit and a speaker, will enunciate the troublesome word, as well as highlighting the word. Similarly, the device according to the present invention, would pronounce each of the syllables of the word, as well as highlighting only that syllable. This process will continue until the word is properly learned.

Yet another embodiment of the present invention would allow the child to associate the manner in which a spoken word is pronounced by associating the spoken word with the mouth movement of an animated character. If the word is properly pronounced, the written equivalent of that will be highlighted in the manner described with other embodiments of the present invention.

Numerous other features, objects, and advantages of the invention will become apparent from the following detailed description when read in connection with the accompanying drawings.

DETAILED DESCRIPTION OF THE PREFERRED EMBODIMENTS

Figure 1:
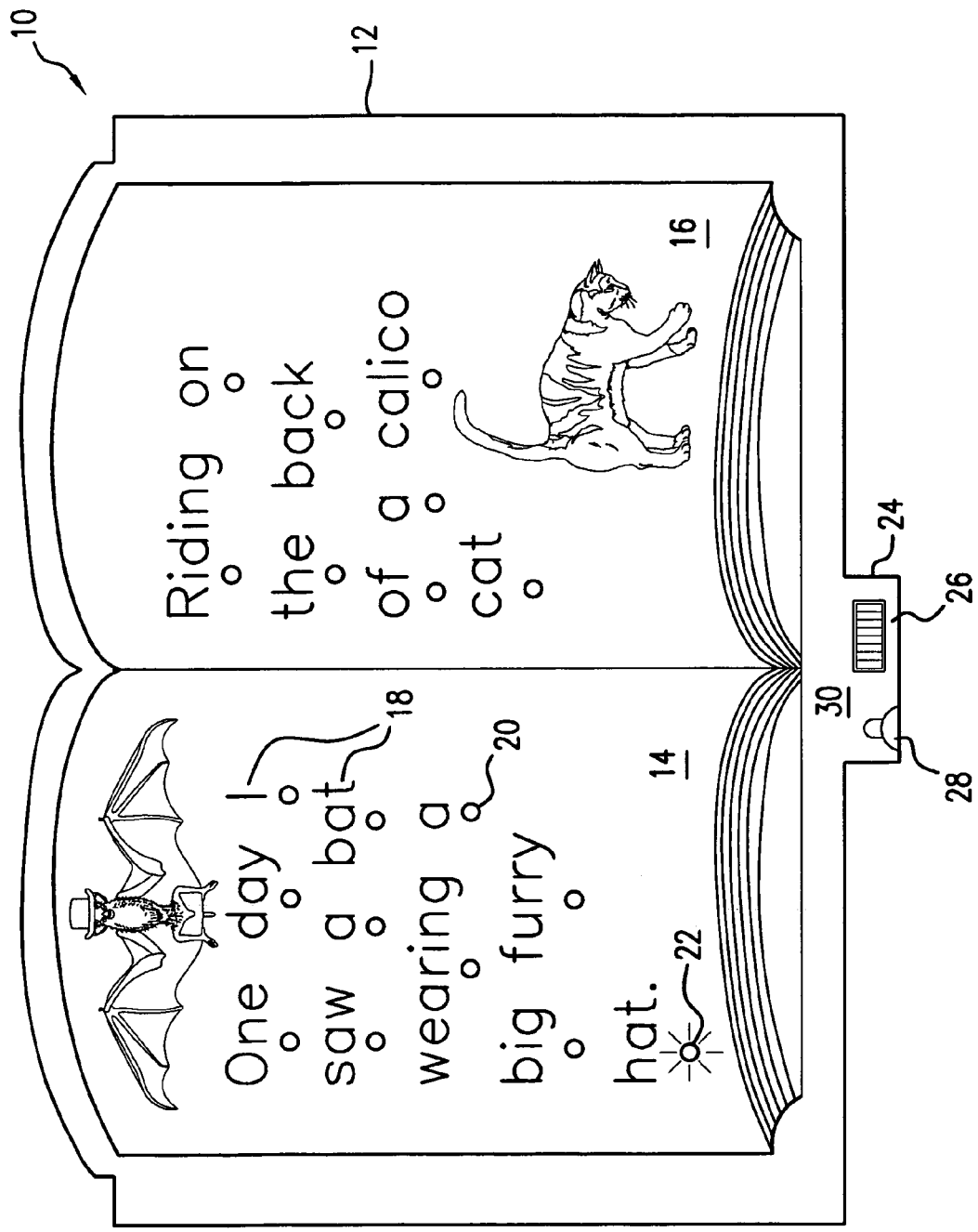
FIG. 1 is a view of one embodiment of the present invention showing a book in the open position.

A first embodiment 10 of the present invention is illustrated with respect to FIG. 1. This figure shows an illustrated book 12 provided with a plurality of pages 14, 16. As shown in this drawing, a number of pages can be included in the book. One or more of the pages is provided with a series of words or sentences as shown with respect to reference numerals 14 and 16. For example, page 14 includes the sentence "One day I saw a bat wearing a big furry hat." made up by a plurality of different words 18. Beneath each of these words is provided a light emitting diode 20. The inside cover 30 of the book 12 includes a bottom portion 24 onto which a microphone 28 and a speaker 26 are affixed. Alternatively, the microphone 28 and speaker 26 could be provided on the cover 30 without the inclusion of section 24. As will be described with respect to FIG. 5, an integrated circuit or microprocessor provided with a speech recognition unit, and in some instances a voice synthesizer, would be affixed to the inside cover or spine of the book (not shown). In use, the child will speak into the microphone 28. This audio input would be converted into a series of digitized words which would be compared to the words provided on the speech recognition chip. Each of the positions of the words 18 on every page of the book 10 would be provided within the microprocessor memory. Therefore, when the word read and simultaneously spoken by the child is recognized by the speech recognition unit, the position of the word on a particular page as well as the page in which the word would appear would be recognized. At this point, the light emitting diode 20 associated with that particular word would be illuminated as shown by light emitting diode 22. The speaker 26 can be included to provide an audio output of the word that the child has just pronounced in the child's own voice. As can be appreciated, the words included in the speech recognition unit need only include the words provided in the interactive book. As depicted in FIG. 1, the microprocessor and the memory as well as the voice unit would be permanently installed in the book when the book is produced. The underside of each of the pages would include a printed circuit connecting each light emitting diode 18 to the microprocessor allowing the particular light emitting diode to be illuminated when the corresponding word has been enunciated by the child.

Figure 2:
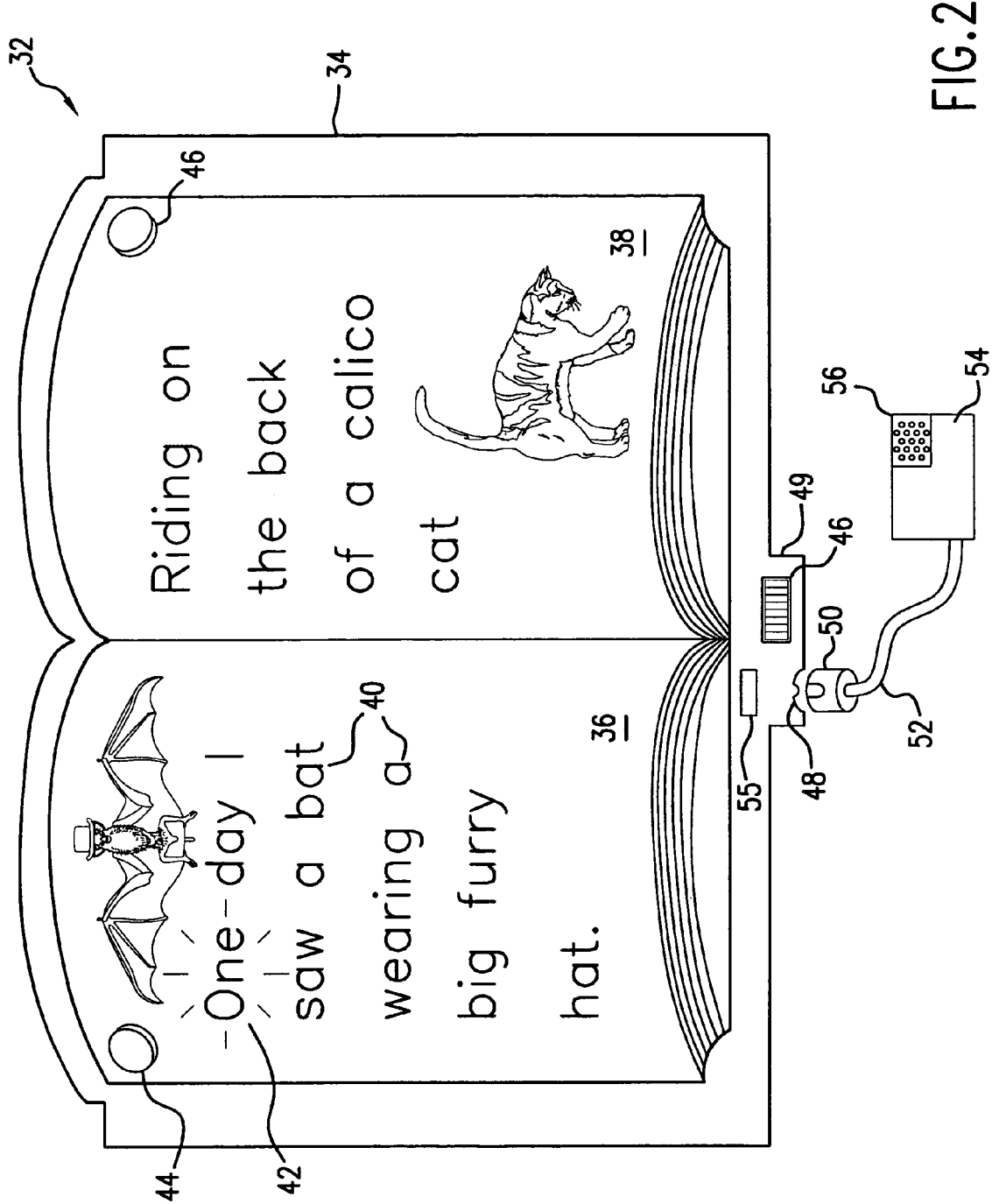
FIG. 2 is a second embodiment of the present invention showing a book in the open position.

FIG. 2 illustrates a second embodiment of the present invention which is in many ways similar to the embodiment illustrated in FIG. 1. In this embodiment 32, a book 34 is also provided with a plurality of pages 36, 38 onto which various words or sentences are provided. Contrary to the pages 14, 16 of FIG. 1 which in many instances would be paper or cardboard in nature, each of the pages 36 and 38 could constitute a display device such as a liquid crystal display. In this instance, each of the displays could permanently include one or more words or sentences constituted by a plurality of words 40 after the book is energized or connected to a power source. Once the child properly pronounces a particular word, the word itself would be illuminated as shown by the word "one" 42. Alternatively, all of the words on page 36 would be illuminated in a first color, such as green. When the child correctly pronounces the word "one", the color of the word would change to a different color, such as blue. Similar to the embodiment shown with respect to FIG. 1, an integrated circuit or microprocessor 54 would include a speech recognition unit as well as a memory provided with the location of all of the words including the particular page that each word is located as well as the position in each page that the word is provided. However, the integrated circuit or microprocessor 54 shown in FIG. 2 could be removable thereby allowing the book 32 to be utilized to teach several stories. In this instance, the integrated circuit or microprocessor 54 is provided with an external microphone 56 plugged into a socket 58 by means of a plug 50 and a wire connection 52. The socket 48 as well as a speaker 49 would be provided on the portion 46 of the spine of the book as shown in FIG. 1. Since the same book can be utilized to allow a child to read several stories, in this instance, the pages 36 and 38 would be initially blank. However, when the integrated circuit 54 including the speech recognition unit as well as the memory location would be plugged into the socket 48, different words would appear on pages 36, 38 dependent upon the integrated circuit or microprocessor plugged into the unit.

Since the book 32 is provided with a plurality of pages, the words 40 could appear on their proper location in each of the pages even though the pages were not as yet uncovered when the integrated circuit is plugged into the socket. Alternatively, the words 40 would appear on pages 36 and 38 only when those pages are uncovered to the child. This could be accomplished by the use of switch like devices 44, 46 which would be depressed by the child when they are ready to read that particular page. Similar to the embodiment shown in FIG. 1, the speaker 49 could produce an audio output of the child's voice. Circuitry would be provided connecting the position of each of the words to the integrated circuit or microprocessor 54 so that the microprocessor would be aware of the exact position of each word on each page. A power source, such as a removable battery (not shown) would be provided to power the electronics of the present invention. The power could be engaged with respect to FIG. 2 when the plug 50 is inserted into the socket 48 or by a separate switch.

Figure 3:
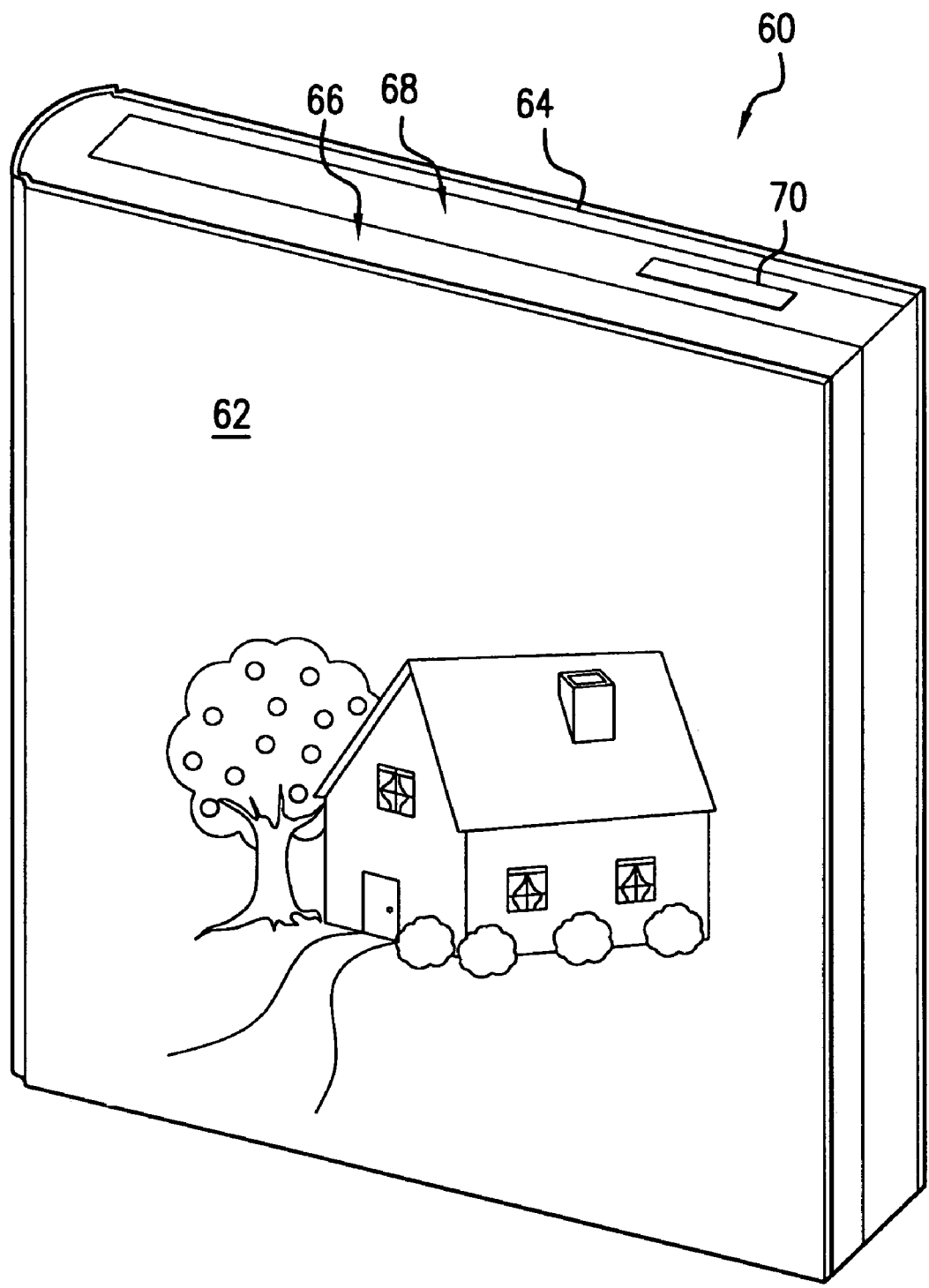
FIG. 3 is a view of a third embodiment of a book in a closed position.
Figure 4:
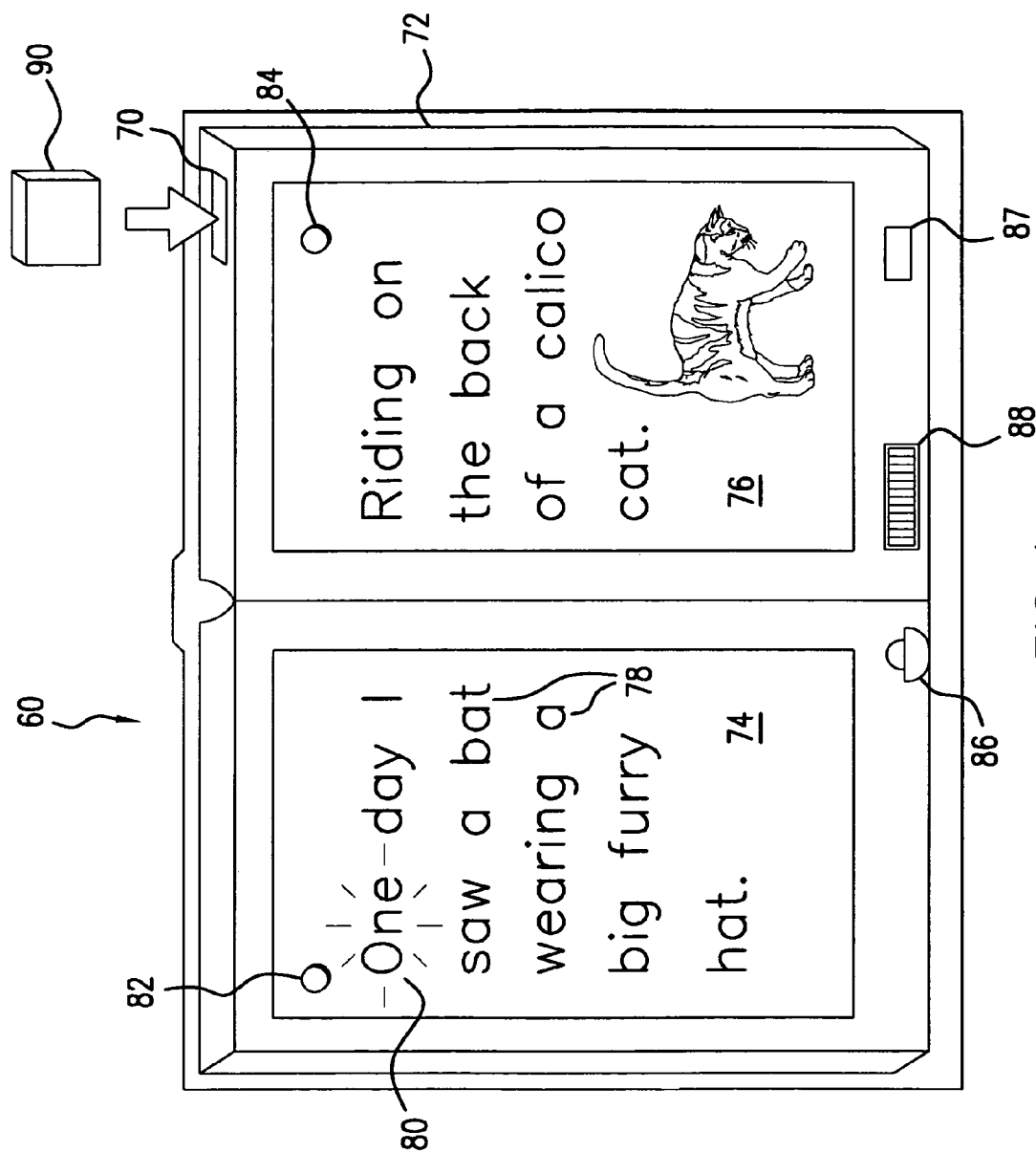
FIG. 4 is a view of the third embodiment of the present invention in the open position.

A third embodiment of the present invention 60 is illustrated with respect to FIGS. 3 and 4. This embodiment shows a book like device including a front cover 62 and a rear cover 64. When opened as shown in FIG. 4, the book is provided merely with a left display panel 66 and a right display panel 68. Each of the panels 66 and 68 would be provided to allow a portion of a story or plurality of words to be displayed thereon such as shown by 74, 76. The words 78, provided on the panels are similar to the first and second embodiments of the present invention and would be illuminated at 80 once the child would properly pronounce that word. One panel 66 could be provided with a microphone 86 and the second panel 68 could be provided with a speaker 88. Similar to the first and second embodiments, a speech recognition chip and a memory chip are associated with the book either permanently or in a removable manner such as illustrated with respect to chip 90 inserted into a slot 70 on the periphery of the rear panel 68. Each of the display panels 66 and 68 could be, for example, a liquid crystal display in which various words, phrases or sentences would be depicted. Each of the display panels 66, 68 could be provided with a switch type device 82 or 84 allowing the child to update the panels in a sequential manner.

Figure 5:
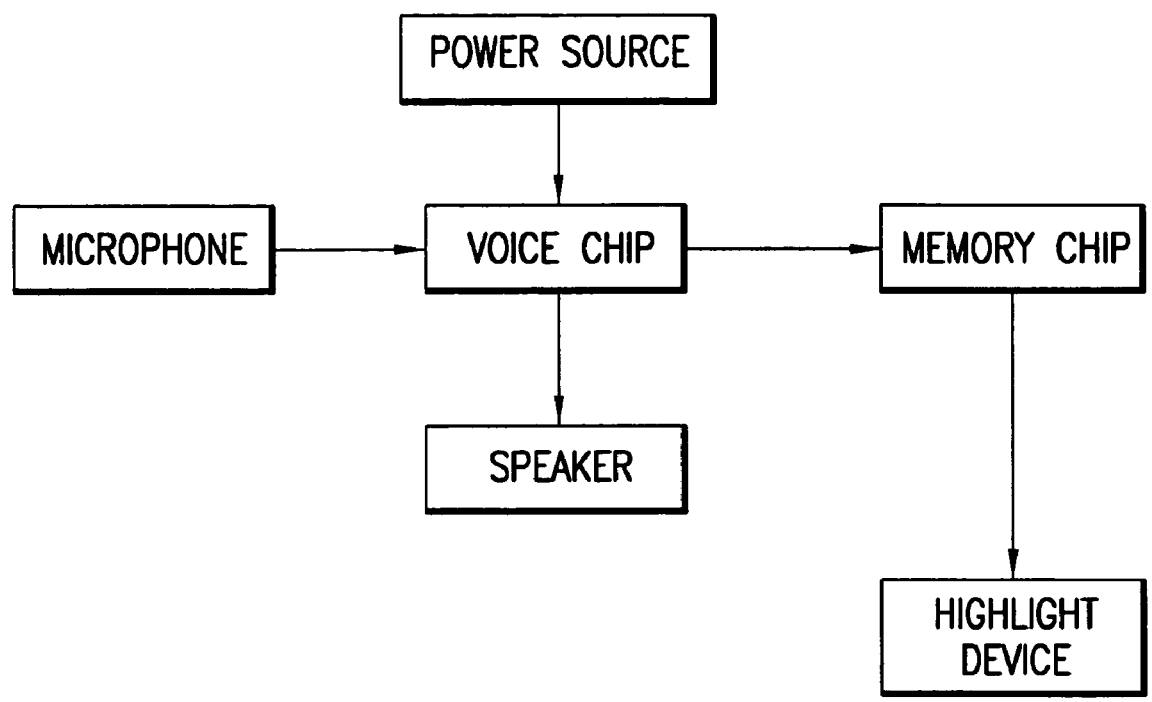
FIG. 5 is a block diagram of an embodiment of the present invention.

FIG. 5 shows a block diagram used with respect to the three embodiments described for the present invention. When a power source such as a battery is energized, and the child speaks into the microphone, a speech recognition chip or voice chip connected to the microphone would recognize the particular word enunciated by the child. The speech recognition chip is in communication with a memory chip indicating the exact page that a word appears and the exact location on that page in which the word appears. Therefore, as a child is properly enunciating that particular word, it would be illuminated in the manner described in FIG. 1, 2 or 4 utilizing a highlight device such as the light emitting diodes 20 or an illumination means such as highlighting the word in a different color on a liquid crystal display. Although not crucial to the present invention, a speaker could also be provided which would be directly connected to the voice chip or would be in a circuit with the microphone to allow the child to hear the word as she pronounces it. Although FIG. 5 shows the use of a speech recognition voice chip and a memory chip, it can be appreciated that these devices can be provided on a single chip or in several chips.

Yet another embodiment of the present invention is illustrated with respect to FIGS. 2 and 4. Both of these figures include an input button 55 (FIG. 2) or 87 (FIG. 4). These input buttons when utilized with the memory chip illustrated in FIG. 5 would allow a parent or other adult to read the story illustrated in the books shown in FIGS. 2 and 4 directly into the memory chip in a manner in which the child would be able to read the story along with the audio output created by the parent or other adult. In both of the books shown in FIGS. 2 and 4, the respective input devices 55 and 87 when engaged, would allow the individual to read the story into the respective microphone and have the story recorded in the memory chip. This memory chip would have the ability to convert the audio output of the individual reader into a digital word stored in the memory. Alternatively, the memory device could include an audio tape similar to that which is used in audio recordings to record the story.

Figure 6:
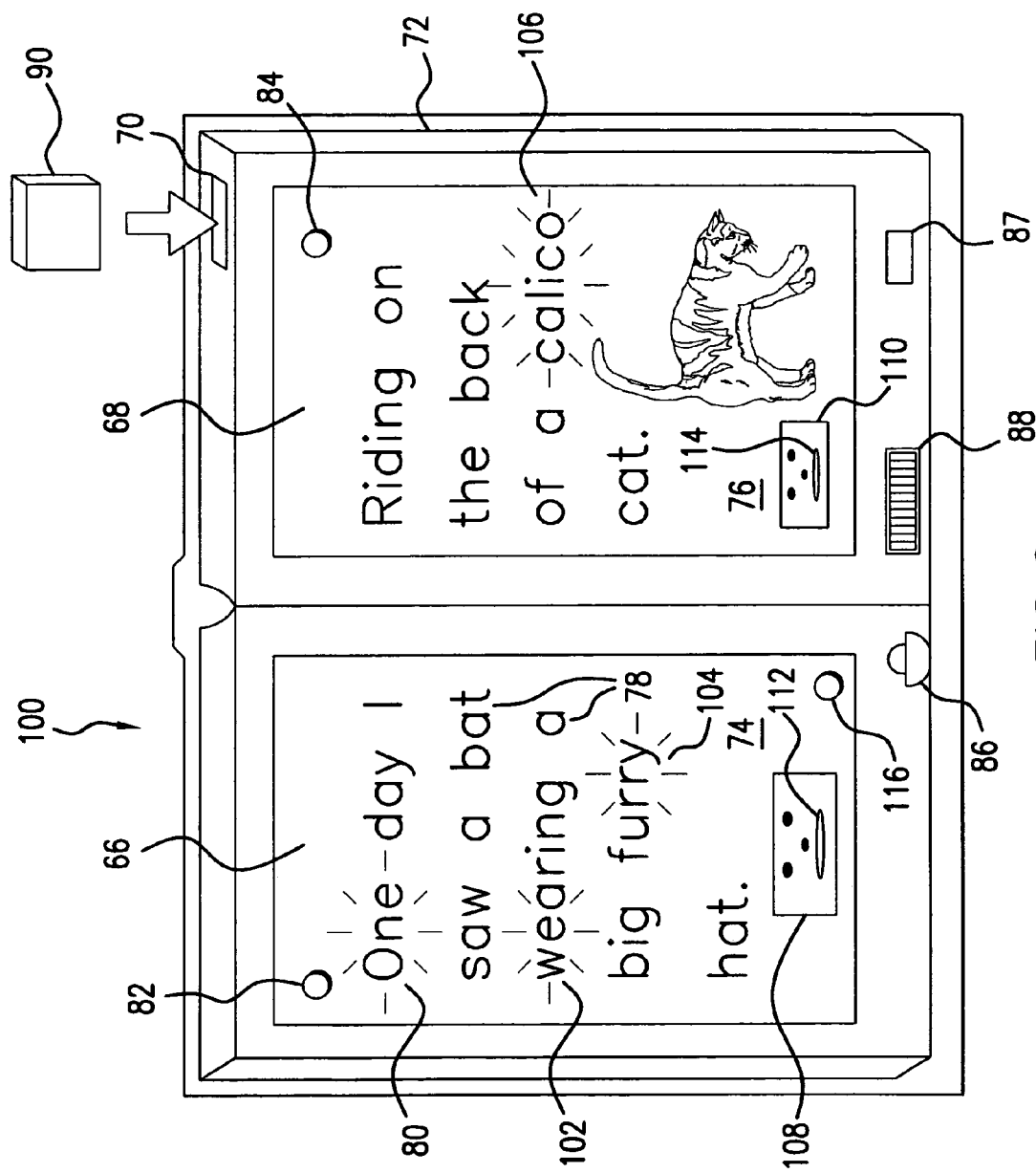
FIG. 6 is a view of a fourth embodiment of the present invention in the open position.
Figure 7:
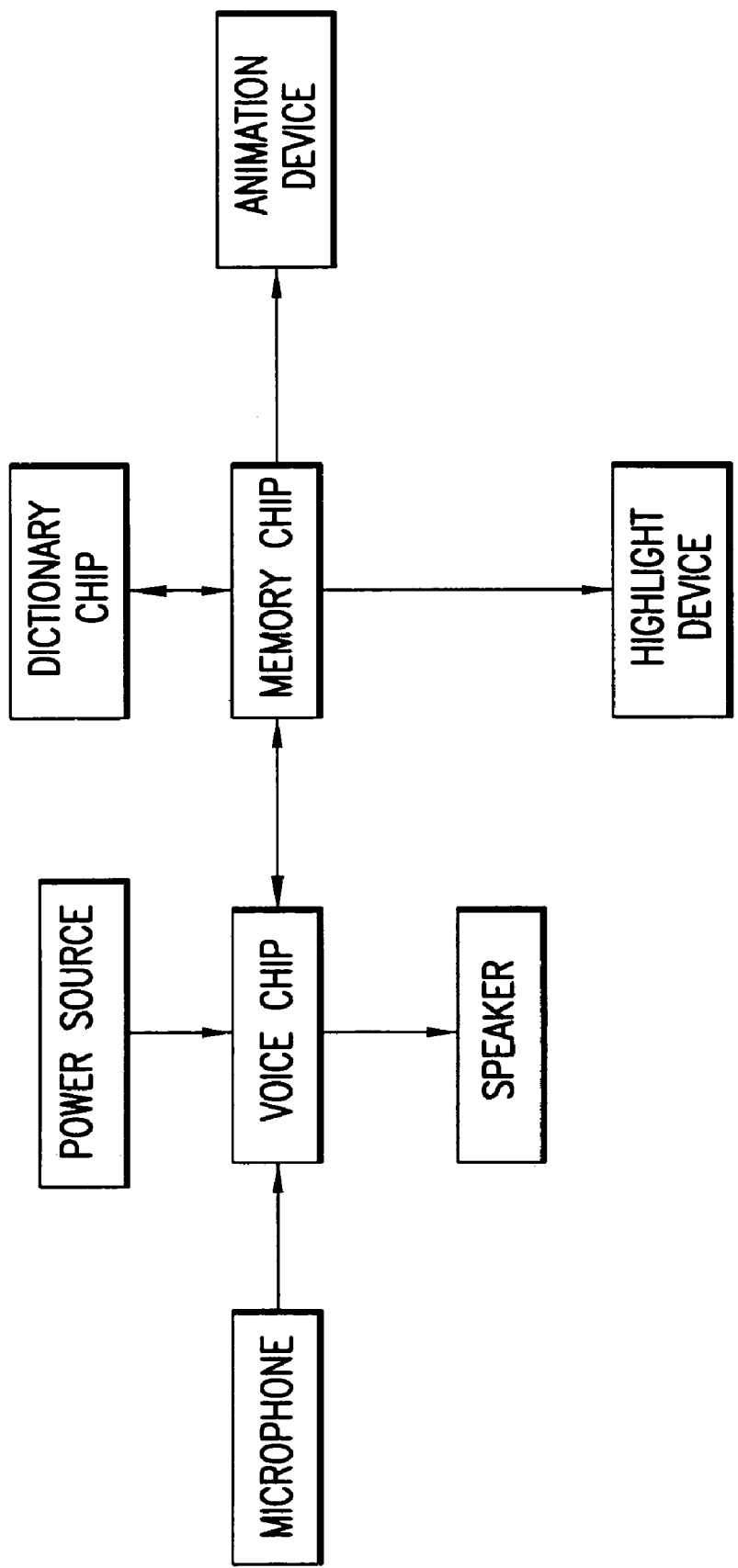
FIG. 7 is a block diagram of the fourth embodiment of the present invention.

A still further embodiment of the present invention is depicted in FIGS. 6 and 7. Similar to the embodiment described with respect to FIG. 4, the interactive book of the present invention would be provided with a left display panel 66 and a right display panel 68 on which a plurality of words are displayed, such as shown by 74, 76. These displays could be liquid crystal displays or similar types of displays. Similar to the embodiment shown in FIGS. 3 and 4, if the child properly pronounces the word shown on one of the displays, it would be illuminated in a highlighted manner such as shown by the word "one" 80. However, if the child mispronounces the word, the present invention would assist the child in pronouncing the word by enunciating the word through the speaker 88. Therefore, the memory chip and voice chip shown in FIG. 7 would have the capability of digitally storing each of the words and then converting these digitally stored words into a spoken word through speaker 88. Simultaneously with the speaker 88 pronouncing the word, it would also be highlighted as shown by the word "one" 80. If the child is having difficulty in pronouncing a word having more than one syllable, such as "wearing" and "furry", each of the syllables would be separately spoken as well as highlighted, as shown by the first syllable 102 in the word "wearing", as well as the last syllable 104 in the word "furry". Once the entire word has been spoken and highlighted in a syllable-by-syllable manner, the entire word would be pronounced and highlighted, such as the word "calico" 106.

Software would be included in the memory of the interactive book of the present invention to produce the spoken word as described with respect to FIG. 6. For example, if the child mispronounces the word "wearing" a predetermined number of times, it would be pronounced for the child and highlighted in the syllable-by-syllable manner as previously described. Alternatively, a timer could be utilized to pronounce the word if a predetermined time has elapsed from the previously correctly pronounced word.

FIGS. 6 and 7 also show an embodiment in which the child's pronunciation of a particular word is enforced utilizing the previously described highlighting scenarios, as well as associating the pronunciation of the word with the movement of the lips of an animated character. As shown in FIG. 6, if the left display panel 66 and right display panel 68 are liquid crystal displays, a portion of that display 108, 110 can be reserved for a character's face including moveable lips 112, 114 which move in concert with a particular word being correctly pronounced and highlighted. The lips of the animation device, when projected onto the liquid crystal displays, would be able to move in a defined manner based upon the sound of the word being pronounced and highlighted. The memory chip would associate the particular word or sound being pronounced with one of the defined movements so that there would be a relationship between the movement of the lips 112, 114 and the word or syllable being pronounced. Although the animated character 108, 110 is shown in FIG. 6 to be provided on one or both of the displays 66, 68, the placement of the animated character need not be so limited. For example, a single animated character might be provided on the spine of the book when it is opened or can be attached to one or more of the top or bottom portions of each of the displays 66, 68.

The present invention could also be provided with a dictionary chip as shown in FIG. 7, allowing a particular word to be further defined. A switch 116 can be provided on the surface of one or more of the displays and, when depressed, more information about a particular word, such as its definition, would enunciated through the speaker 88 after that word has been properly pronounced either by the child or by the device itself.

In use, when the individual initiates the recording by depressing or otherwise engaging the input devices 55 and 87, the individual would begin speaking into the respective microphone. Since the idea of this device would be to allow a child to read along with the audio story created by the parent or adult, it is important for the child to know when to turn the page of the book shown in FIG. 2 or to go to another panel with respect to the book shown in FIG. 4 or FIG. 6. Therefore, the input devices 55 and 87 are used to create a sound at the end of each page of reading to indicate to the child that he or she must go on to the next page to continue reading. Consequently, when the reader initially records the story, input button 55 or 87 would include a mode which would be activated by the individual reader to insert this particular sound. Alternatively, a second input device associated with input devices 55 or 87 could be utilized. It is noted that this sound could be included in the memory chip when it is manufactured and inserted into the reading device. Therefore, when the child is reading the book along with the audio output, when the audio output reaches the end of a particular written page, the aforementioned sound would be generated, thereby informing the child that the page must be turned, or the child must proceed to the next panel.

When the story is read into the book by a parent, adult or other individual, and a digital memory chip is utilized, it is noted that similar to the previous embodiments, the particular word which is enunciated would be highlighted in various manners. However, it is noted that if an analog device is used as the memory in which a story is recorded by the adult or other individual, the highlighting function would not operate in the manner described with respect to the previous embodiment of the present invention.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An interactive book comprising:
   at least one display device onto which a series of words are removably displayed, and said series of words visible on said display device prior to said series of words enunciated by an individual in a non-recorded manner;
   a microphone;
   an electronic speech recognition device in communication with said microphone for recognizing the spoken word;
   a memory device in connection with said speech recognition device and said display device, said memory device provided with the location in which each of the words are displayed on said display device, said memory device determining whether one of said series of words displayed on said at least one said display device was properly enunciated by the individual; and
   a highlighting device for highlighting one of the words provided on said display device subsequent to the individual properly enunciating said one of the words in a non-recorded manner.

2. The interactive book in accordance with claim 1, wherein said display device includes a liquid crystal display.

3. The interactive book in accordance with claim 2, wherein only a single liquid crystal display is provided on the left side of the book, and only a single liquid crystal display is provided on the right side of the book.

4. The interactive book in accordance with claim 1, wherein said series of words initially appear on said display device in a first color and said highlighting device highlights one of said series of words in a second color subsequent to the individual properly enunciating one of said series of words in a non-recorded manner.

5. The interactive book in accordance with claim 1, wherein said speech recognition device and said memory device are removable from the book.

6. The interactive book in accordance with claim 1, wherein said book is portable and includes a rechargeable power source.

7. The interactive book in accordance with claim 1, further including a speaker for providing an aural output of the enunciated word.

8. The interactive book in accordance with claim 3, wherein each of said liquid crystal displays are provided with a switch activated by the individual in connection with said memory device for positively transmitting to said memory device, the page the individual is reading.

* * * * *